US012694407B1

(12) United States Patent　　　　(10) Patent No.:　US 12,694,407 B1

Dadon　　　　　　　　　　　　　(45) Date of Patent:　　　Jul. 28, 2026

(54) AUTONOMOUS AUDITING OF DIGITAL ASSET RESERVES USING A MULTI-MODEL ARCHITECTURE

(71) Applicant: Stable Protocol LLC, Melbourne (AU)

(72) Inventor: Albert Dadon, Melbourne (AU)

(73) Assignee: StableProtocol LLC, Melbourne (AU)

( * ) Notice: Subject to any disclaimer, the term of this patent is extended or adjusted under 35 U.S.C. 154(b) by 0 days.

(21) Appl. No.: 19/400,910

(22) Filed: Nov. 25, 2025

(51) Int. Cl.
　　　*G06Q 20/40*　　　　(2012.01)
　　　*G06Q 20/38*　　　　(2012.01)
(52) U.S. Cl.
　　　CPC ....... *G06Q 20/4016* (2013.01); *G06Q 20/389* (2013.01)
(58) Field of Classification Search
　　　CPC .......................... G06Q 20/4016; G06Q 20/389
　　　USPC .......................................................... 705/44
　　　See application file for complete search history.

(56) References Cited

U.S. PATENT DOCUMENTS

| | | | |
|---|---|---|---|
| 2025/0053985 A1* | 2/2025 | Moy ................... | G06Q 20/4016 |
| 2026/0019342 A1* | 1/2026 | Perg ...................... | H04L 41/145 |
| 2026/0087477 A1* | 3/2026 | Kellerer ............... | G06N 3/0464 |

FOREIGN PATENT DOCUMENTS

| | | | | |
|---|---|---|---|---|
| WO | WO-2024092183 A2 * | 5/2024 | ............. | G06N 3/088 |
| WO | WO-2025160388 A1 * | 7/2025 | ............... | G06N 7/01 |

OTHER PUBLICATIONS

Balusamy et al., "Protecting Financial Transactions and Cryptocurrency Networks from Fraud Using AI-Powered Blockchain Technology" 2025 Global Conference in Emerging Technology (GINOTECH), (2025, pp. 1-6) DOI: 10.1109/GINOTECH63460. 2025.11076940. (May 2025) (Year: 2025).*

Mahrous et al., "Stablecoins: Fundamentals, Emerging Issues, and Open Challenges." arXiv. org Papers 2507.13883. https://doi.org/ 10.48550/arXiv.2507.13883 (Jul. 2025) (Year: 2025).*

* cited by examiner

*Primary Examiner* — Ambreen A. Alladin

(74) *Attorney, Agent, or Firm* — Jones Day

(57) ABSTRACT

A process for continuously verifying the reserve backing of a blockchain-based digital token using a parallel, model-ensemble audit pipeline. At predefined intervals, current reserve data and token circulation data are ingested from multiple independent sources and processed concurrently by a plurality of distinct models, such as a supervised learning model that outputs a fraud probability, an unsupervised anomaly detection model that computes an anomaly score, a time-series analysis model that assesses trend health and forecasts reserve ratio trajectories, and a deterministic rule-based compliance engine that evaluates non-probabilistic regulatory and policy constraints. A consensus engine aggregates outputs from the models to determine an audit status, and a cryptographic attestation of the audit status can be generated and recorded to a first blockchain with near-real-time finality. Multiple attestations collected in this manner can be periodically batched and anchored via a Merkle root to a second blockchain to provide immutable checkpointing.

20 Claims, 12 Drawing Sheets

300

310

400

402

DIGITAL CURRENCY DATA

404

TRAINED SUPERVISED LEARNING MODEL

406

SUPERVISED LEARNING MODEL OUTPUTS

408

OUTPUT TO CONSENSUS ENGINE

600

602
HISTORICAL TIME-SERIES

604
CURRENT OBSERVATIONS

612
TECHNIQUE 1: ARIMA MODELS

614
TECHNIQUE 2: LSTM NETWORKS

616
TECHNIQUE 3: SEASONAL DECOMP

618
TECHNIQUE 4: CHANGE POINT DETECTION

620
COMPARISON & DEVIATION ANALYSIS

622
MODEL OUTPUTS

624
OUTPUT TO CONSENSUS ENGINE

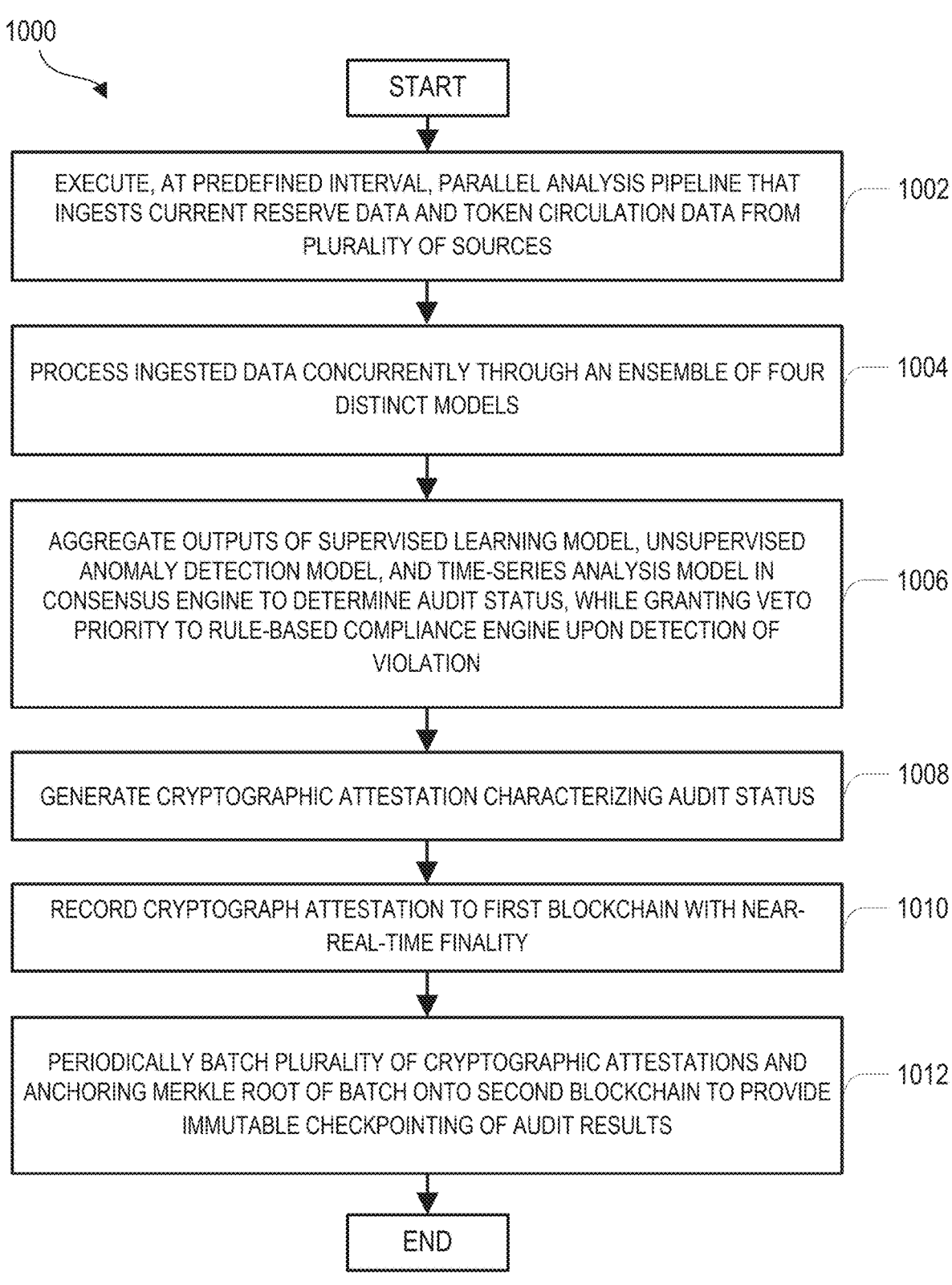

1000

START

EXECUTE, AT PREDEFINED INTERVAL, PARALLEL ANALYSIS PIPELINE THAT INGESTS CURRENT RESERVE DATA AND TOKEN CIRCULATION DATA FROM PLURALITY OF SOURCES — 1002

PROCESS INGESTED DATA CONCURRENTLY THROUGH AN ENSEMBLE OF FOUR DISTINCT MODELS — 1004

AGGREGATE OUTPUTS OF SUPERVISED LEARNING MODEL, UNSUPERVISED ANOMALY DETECTION MODEL, AND TIME-SERIES ANALYSIS MODEL IN CONSENSUS ENGINE TO DETERMINE AUDIT STATUS, WHILE GRANTING VETO PRIORITY TO RULE-BASED COMPLIANCE ENGINE UPON DETECTION OF VIOLATION — 1006

GENERATE CRYPTOGRAPHIC ATTESTATION CHARACTERIZING AUDIT STATUS — 1008

RECORD CRYPTOGRAPH ATTESTATION TO FIRST BLOCKCHAIN WITH NEAR-REAL-TIME FINALITY — 1010

PERIODICALLY BATCH PLURALITY OF CRYPTOGRAPHIC ATTESTATIONS AND ANCHORING MERKLE ROOT OF BATCH ONTO SECOND BLOCKCHAIN TO PROVIDE IMMUTABLE CHECKPOINTING OF AUDIT RESULTS — 1012

END

START

OBTAIN CURRENT RESERVE DATA AND TOKEN CIRCULATION DATA FROM PLURALITY OF SOURCES — 1102

EXECUTE, IN PARALLEL, PLURALITY OF APPLIED MODELS — 1104

COMPUTE, IN CONSENSUS DECISION OPERATION, AN AUDIT STATUS BASED ON OUTPUTS OF PLURALITY OF MODELS — 1106

REJECT EXECUTION OF AT LEAST ONE PENDING TOKEN TRANSACTION BASED ON AGGREGATED OUTPUTS OF PLURALITY OF MODELS — 1108

END

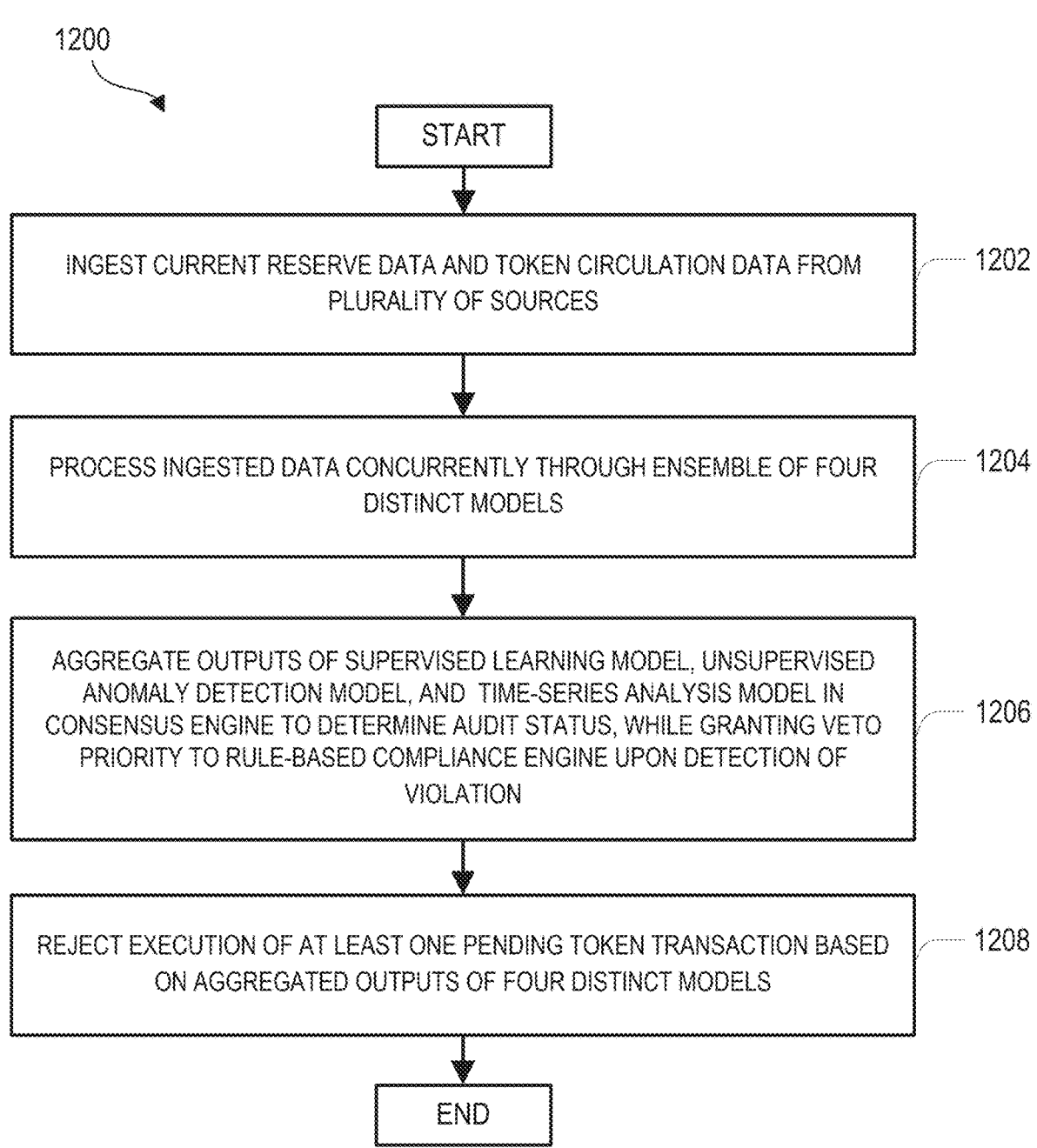

1200

START

INGEST CURRENT RESERVE DATA AND TOKEN CIRCULATION DATA FROM PLURALITY OF SOURCES — 1202

PROCESS INGESTED DATA CONCURRENTLY THROUGH ENSEMBLE OF FOUR DISTINCT MODELS — 1204

AGGREGATE OUTPUTS OF SUPERVISED LEARNING MODEL, UNSUPERVISED ANOMALY DETECTION MODEL, AND TIME-SERIES ANALYSIS MODEL IN CONSENSUS ENGINE TO DETERMINE AUDIT STATUS, WHILE GRANTING VETO PRIORITY TO RULE-BASED COMPLIANCE ENGINE UPON DETECTION OF VIOLATION — 1206

REJECT EXECUTION OF AT LEAST ONE PENDING TOKEN TRANSACTION BASED ON AGGREGATED OUTPUTS OF FOUR DISTINCT MODELS — 1208

END

FIG. 12

AUTONOMOUS AUDITING OF DIGITAL ASSET RESERVES USING A MULTI-MODEL ARCHITECTURE

TECHNICAL FIELD

The subject matter described herein relates to techniques for performing digital currency transactions, and more particularly to auditing digital currency reserves.

BACKGROUND

Digital stablecoins are blockchain-based tokens designed to maintain a predictable value—typically pegged 1:1 to a reference asset like the U.S. dollar—by combining on-chain programmability with off-chain economic guarantees. At the base layer, a stablecoin is an entry on a public ledger (such as Ethereum, Solana, or other chains), controlled by a smart contract that defines issuance, transfer, and redemption rules under a common token standard (for example, ERC-20 on Ethereum). Users hold balances tied to their cryptographic key pairs, and transfers are authorized via digital signatures and settled through the network's consensus mechanism, yielding near-instant, final settlement and global auditability of token flows. The peg is maintained through one of several architectures. For instance, Fiat-backed models store cash and cash-equivalent reserves with banks and custodians; new tokens are "minted" when users deposit dollars with the issuer and "burned" when users redeem tokens for dollars, while attestations or audits of reserves provide confidence that circulating supply is fully collateralized. Operationally, fees arise from blockchain transaction costs and, in some models, from issuance/redemption or bridge operations across chains. The result is a token that behaves like programmable cash: composable in smart contracts, interoperable across financial applications, and stable in value due to collateral, redemption rights, and market incentives that continuously anchor its price to the reference asset.

SUMMARY

The present disclosure provides systems and methods for continuous autonomous auditing of digital currency reserves, including continuously verifying the reserve backing of a blockchain-based digital token, using a multi-model artificial intelligence ensemble with dual blockchain settlement. The techniques described herein can allow for continuous reserve verification without audit gaps by executing rolling verification cycles that ingest current reserve and token circulation data from multiple independent sources and process them in parallel. The audit pipeline can employ multiple independent AI models operating concurrently—a supervised fraud classifier, an unsupervised anomaly detector, a time-series trend and forecast model, and a deterministic rule-based compliance engine—thereby providing model redundancy and mitigating single points of failure. A consensus layer can then aggregate model outputs to support real-time detection of anomalies, fraud patterns, and compliance violations through collective analysis, with cryptographic attestations of a resulting audit status recorded on a first blockchain for near-real-time finality. To further enhance integrity, multiple attestations can be periodically batched and anchored to a second blockchain, providing dual-layer settlement that combines high-frequency operational verification with periodic security anchoring.

In one aspect, the present disclosure provides a method for continuously verifying reserve backing of a digital token on a blockchain. The method can be implemented by one or more computing devices. The method can include executing, at a predefined interval, a parallel analysis pipeline that ingests current reserve data and token circulation data from a plurality of sources. The method can also include processing the ingested data concurrently through an ensemble of four distinct models comprising: (i) a supervised learning model configured to compute a fraud probability based on labeled transaction features and known fraud patterns; (ii) an unsupervised anomaly detection model configured to compute an anomaly score by comparing observed multi-variate behavior to a learned baseline; (iii) a time-series analysis model configured to compute trend health and to forecast reserve ratio trajectories across multiple temporal horizons; and (iv) a deterministic rule-based compliance engine configured to evaluate non-probabilistic regulatory and policy constraints. The method can further include aggregating outputs of the supervised learning model, the unsupervised anomaly detection model, and the time-series analysis model in a consensus engine to determine an audit status, while granting veto priority to the rule-based compliance engine upon detection of a violation. The method can also include generating a cryptographic attestation characterizing the audit status, recording the cryptographic attestation to a first blockchain with near-real-time finality, and periodically batching a plurality of cryptographic attestations and anchoring a Merkle root of the batch onto a second blockchain to provide immutable checkpointing of audit results.

In another aspect, the present disclosure provides a non-transitory computer-readable medium storing instructions that, when executed by one or more processors, cause the processors to perform operations. The operations can include obtaining current reserve data and token circulation data from a plurality of sources. The operations can also include executing, in parallel, a plurality of applied models comprising: a deterministic rule-based compliance process that outputs constraint evaluations with hard pass/fail determinations, and at least one of the following: a supervised learning model configured to compute a fraud probability based on labeled transaction features and known fraud patterns, an unsupervised anomaly detection model configured to compute an anomaly score by comparing observed multi-variate behavior to a learned baseline, or a time-series analysis model configured to compute trend health and to forecast reserve ratio trajectories across multiple temporal horizons. The operations can further include computing, in a consensus decision operation, an audit status based on outputs of the plurality of models and rejecting execution of at least one pending token transaction based on the aggregated outputs of the plurality of models.

In yet another aspect, the present disclosure provides a method for verifying reserve backing of a digital token on a blockchain. The method can be implemented by one or more computing devices. The method can include ingesting current reserve data and token circulation data from a plurality of sources. The method can also include processing the ingested data concurrently through an ensemble of four distinct models comprising: (i) a supervised learning model configured to compute a fraud probability based on labeled transaction features and known fraud patterns, (ii) an unsupervised anomaly detection model configured to compute an anomaly score by comparing observed multi-variate behavior to a learned baseline, (iii) a time-series analysis model configured to compute trend health and to forecast reserve ratio trajectories across multiple temporal horizons, and (iv) a deterministic rule-based compliance engine configured to evaluate non-probabilistic regulatory and policy constraints.

The method can further include aggregating outputs of the supervised learning model, the unsupervised anomaly detection model, and the time-series analysis model in a consensus engine to determine an audit status, while granting veto priority to the rule-based compliance engine upon detection of a violation. The method can also include rejecting execution of at least one pending token transaction based on the aggregated outputs of the four distinct models.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 10 is a first process flow diagram illustrating aspects relating to a method for continuously verifying reserve backing of a digital token on a blockchain.

FIG. 12 is a third process flow diagram illustrating aspects relating to a method for verifying reserve backing of a digital token on a blockchain.

DETAILED DESCRIPTION

Figure 1:
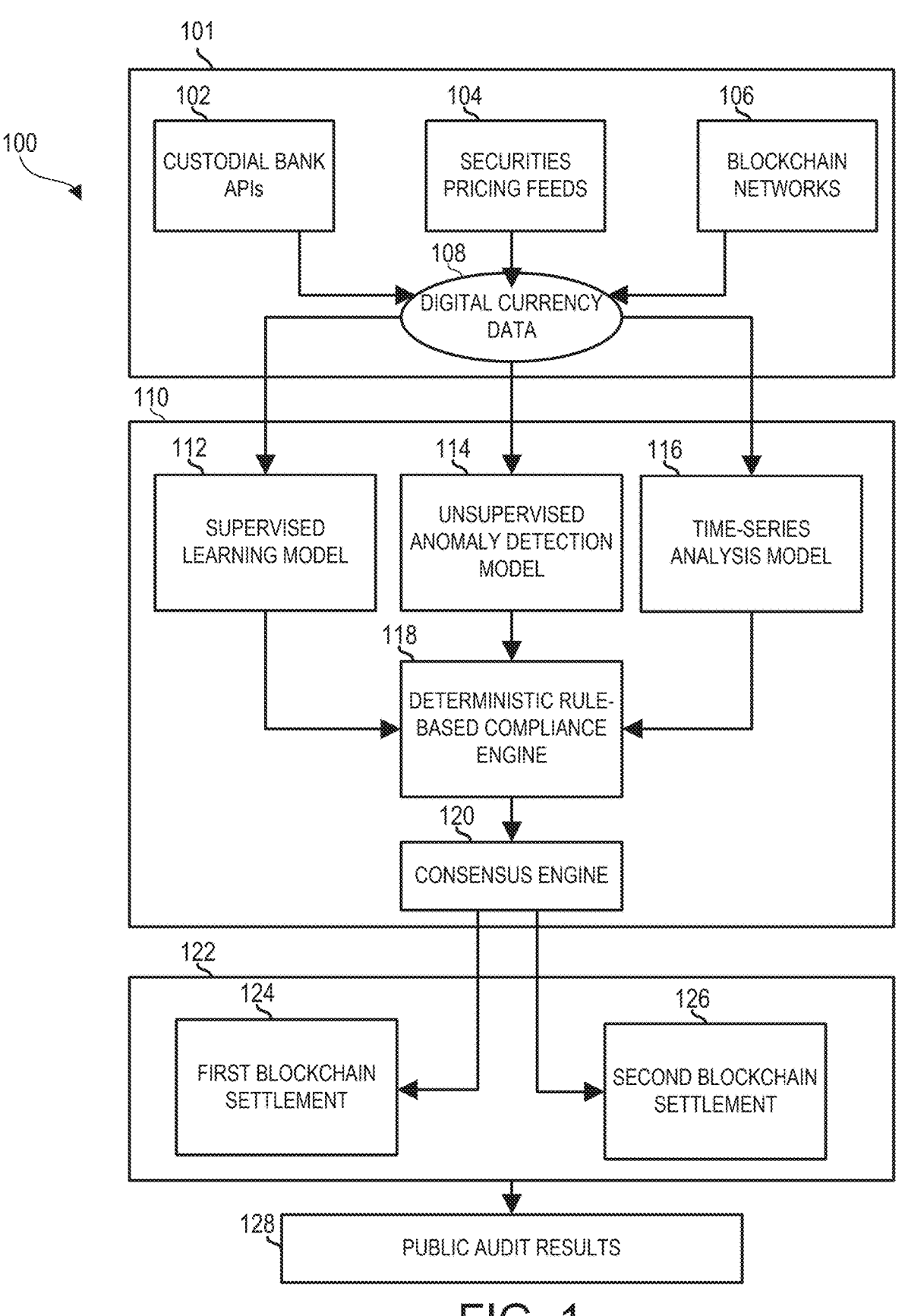
FIG. 1 is a diagram illustrating an architecture for auditing a stablecoin via a plurality of AI models, a consensus engine, and a dual blockchain settlement structure.

As discussed above, attestations or audits of reserves provide confidence that the circulating supply is fully collateralized for digital stablecoins. However, there are numerous, interrelated problems with traditional stablecoin assurance frameworks that collectively undermine continuous, trustworthy reserve verification. For example, traditional stablecoin assurance frameworks often depend on periodic, after-the-fact attestations-typically quarterly or semi-annual engagements by third-party auditors. These episodic reviews inherently create extended intervals in which reserve assets can be borrowed, transferred, re-hypothecated, misclassified, or otherwise misrepresented without contemporaneous detection. During these intervals, end users and market participants are forced to rely on trust rather than verifiable evidence of reserve sufficiency, undermining the core promise of a fully backed instrument and magnifying the risk of undetected shortfalls or operational misconduct.

Compounding these audit gaps, conventional audit approaches typically concentrate verification authority in a single methodology or a single auditing entity, thereby creating a systemic single point of failure. If that methodology is flawed or the auditor is compromised, conflicted, deceived, or simply makes an error, the integrity of the entire reserve verification collapses. The present disclosure recognizes that existing systems do not orchestrate multiple, independent, and concurrently operating verification modalities capable of cross-checking each other, leaving the ecosystem vulnerable to fraud, manipulation, and process drift that can persist undetected. This concentration also exacerbates delayed detection where discrepancies in reserve balances, asset quality, or custody status are typically surfaced only at the next scheduled audit event. This latency can span months, allowing errors or intentional misstatements to compound and enabling material discrepancies to propagate through the financial system. By the time any variance is identified, the window for containment, remediation, or asset recovery can have closed, resulting in losses to coin holders and systemic contagion risks.

Delayed detection is further aggravated by limited transparency: stablecoin operators generally provide sparse, delayed, or aggregated disclosures regarding reserve composition, custody locations, encumbrances, and real-time valuations. In the absence of continuous, granular transparency, users cannot independently verify the operator's claims between audits, nor can they assess intra-period changes in risk exposures such as duration, credit concentration, or liquidity mismatches. This opacity erodes market confidence and impedes informed decision-making by regulators, counterparties, and end users. The lack of transparency also creates regulatory compliance gaps, since manual and periodic compliance checks are ill-suited to environments characterized by continuous issuance, redemption, and reserve rebalancing. Static controls and discrete testing struggle to keep pace with dynamic operations, creating temporal gaps in which regulatory limits, disclosure obligations, or internal policy thresholds can be breached without timely detection. These blind spots can expose operators to heightened enforcement risk, reputational damage, and potential suspension of market access.

The present disclosure also recognizes that traditional, human-centric audit methods do not scale effectively to the transaction volumes, asset diversity, and operational velocity typically associated with leading stablecoins. And as reserve portfolios grow in size and complexity—spanning multiple custodians, jurisdictions, and asset classes—traditional procedures become cost-prohibitive, slow, and error-prone. The lack of scalable, automated verification pipelines prevents continuous assurance at the granularity and frequency necessary to maintain robust market integrity.

Recognizing the aforementioned deficiencies with traditional stablecoin assurance frameworks, as well as others, the present disclosure provides systems and methods for a continuous, autonomous auditing architecture that addresses audit latency, coverage gaps, and the single-point vulnerabilities inherent in conventional reserve verification. By executing frequent verification cycles across a high-throughput settlement layer, the techniques described herein can deliver near-real-time assurance of reserve integrity, dramatically reducing the window for undetected discrepancies in asset balances, token supply, and valuation inputs. Multiple independent AI models, such as supervised classification, unsupervised anomaly detection, time-series forecasting, and rule-based compliance models, can operate in parallel to provide redundant, complementary verification. This multi-modal analysis can capture both known fraud signatures and novel deviations, contextualize temporal trends in reserve movements, and enforce explicit regulatory constraints, substantially improving detection sensitivity and specificity. A consensus engine can consolidate the heterogeneous outputs from the ensemble of AI models and apply multi-signature validation logic to require cross-model agreement for final audit determinations, thereby mitigating model bias, reducing false positives and false negatives, and eliminating single points of failure. Furthermore, real-time collection of custodial balances, securities pricing feeds, and blockchain state ensures that audit decisions are grounded in current, comprehensive data.

A dual blockchain settlement strategy further augments integrity and transparency by recording validated audit results at two distinct cadences: high-frequency anchoring on an operational blockchain layer (e.g., International Bitcoin Virtual Machine (IBVM)) and daily immutability checkpoints on a second blockchain (e.g., Bitcoin). This approach can combine rapid operational verifiability with deep security guarantees, creating an auditable, tamper-evident trail that is publicly accessible for independent scrutiny. As will be further described, automated alerting and remediation workflows can be triggered upon detection of discrepancies, enabling immediate operational response and reducing time-to-resolution. Collectively, these features deliver continuous assurance, resilient verification, and cryptographically backed transparency that provides material advancements over existing digital currency reserve auditing techniques.

While the present disclosure is often described as focusing on continuous, autonomous assurance for stablecoin reserve verification, it should be readily appreciated that the teachings described herein are also applicable to any system requiring high-frequency, tamper-evident verification of data integrity, compliance, or operational risk across finance, supply chains, energy, healthcare, IoT, identity, and regulatory reporting. By leveraging parallel AI models, consensus-based validation, real-time data ingestion, and multi-chain anchoring, these techniques provide near-real-time, publicly verifiable assurance beyond digital currency contexts. Additionally, it should be apparent that the techniques described herein are generally applicable to digital assets beyond stablecoins, including asset-backed tokens, tokenized securities, or other reserve-backed digital instruments.

FIG. 1 depicts an architecture 100 for auditing a stablecoin. As shown, the system 100 is architected as a modular pipeline comprising a data collection subsystem 101, an AI ensemble subsystem 110 that includes a consensus engine 120, and a dual blockchain settlement subsystem 122. Each subsystem can be independently scalable and fault-isolated, with defined interfaces to facilitate reliable, continuous audit cycles. As illustrated, the subsystems 101-122 can operate in a closed-loop arrangement to acquire digital currency data 108, apply a plurality of auditing models 112, 114, 116, 118, render a cross-validated audit determination, and persist attestations onto two blockchain networks 124, 126 at distinct cadences.

Generally, the data collection subsystem 101 can interface with multiple external systems including custodial bank APIs 102, securities pricing feeds 104, and blockchain networks 106. In this manner, the data collection subsystem 110 can be configured to obtain, at a predefined interval, current reserve data and token circulation data from a plurality of sources. The subsystem 110 then aggregates information characterizing reserve asset balances, market valuations, and circulating token supply, and normalizes the aggregated data into model-ready feature sets that can be provided as input to the AI ensemble subsystem 110. In some implementations, the plurality of sources for reserve data includes at least three independent custodians, thereby enabling cross-verification of reserve balances across custodial venues and custody diversification as part of non-probabilistic regulatory and policy constraints. The predefined interval can be less than 1 hour and, in some implementations, is less than or equal to about one minute such that each audit cycle completes within less than or equal to about one minute including data ingestion, model execution, consensus determination, and attestation recording.

The AI ensemble subsystem 110 can rely on a number of independent analytical components that operate in parallel over the same normalized input, such as a supervised learning model 112, an unsupervised anomaly detection model 114, a time-series analysis model 116, and a rule-based compliance model 116. As will be further described, the supervised learning model 112 can be used for pattern detection and be configured to compute a fraud probability by applying a classifier trained on labeled examples of reserve shortfalls, timing mismatches between custodial balances and token supply, anomalous issuance patterns, and price manipulation indicators. The unsupervised anomaly detection model 114 can be used for anomaly detection and can be configured to compute an anomaly score using one or more algorithms, contrasting current multivariate behavior against a learned baseline of normal operations. The time-series analysis model 116 can be used for trend monitoring and can be configured to evaluate trend health by forecasting reserve trajectories across micro-pattern, daily, weekly, and monthly horizons. Finally, the rule-based compliance model 118 can be used for regulatory enforcement and can be configured to apply deterministic constraints reflecting regulatory and policy requirements. The models 112-118 within the AI ensemble subsystem 110 can therefore be architected for redundancy and complementarity.

With continued reference to FIG. 1, each model 112-118 can be structured to generate an output comprising a score or classification, which can be received by the consensus engine 120. The consensus engine 120 can apply multi-signature validation logic governed by threshold rules to compute a final audit status, as will be further described. The consensus engine 120 can then produce the final audit result that can be provided to the dual blockchain settlement subsystem 122 for attestation. The dual blockchain settlement subsystem 122 can record the audit results on two blockchains. The first blockchain 124 (e.g., IBVM) can provide near-real-time settlement, recording each cryptographic attestation at the predefined interval. The second blockchain 126 (e.g., Bitcoin) can provide immutable checkpointing by batching attestations and anchoring a Merkle root, in some cases daily. In this manner, the audit results 128 can be publicly accessible as cryptographic attestations recorded to both blockchains 124, 126, thereby providing immutable and transparent audit records.

Figure 2:
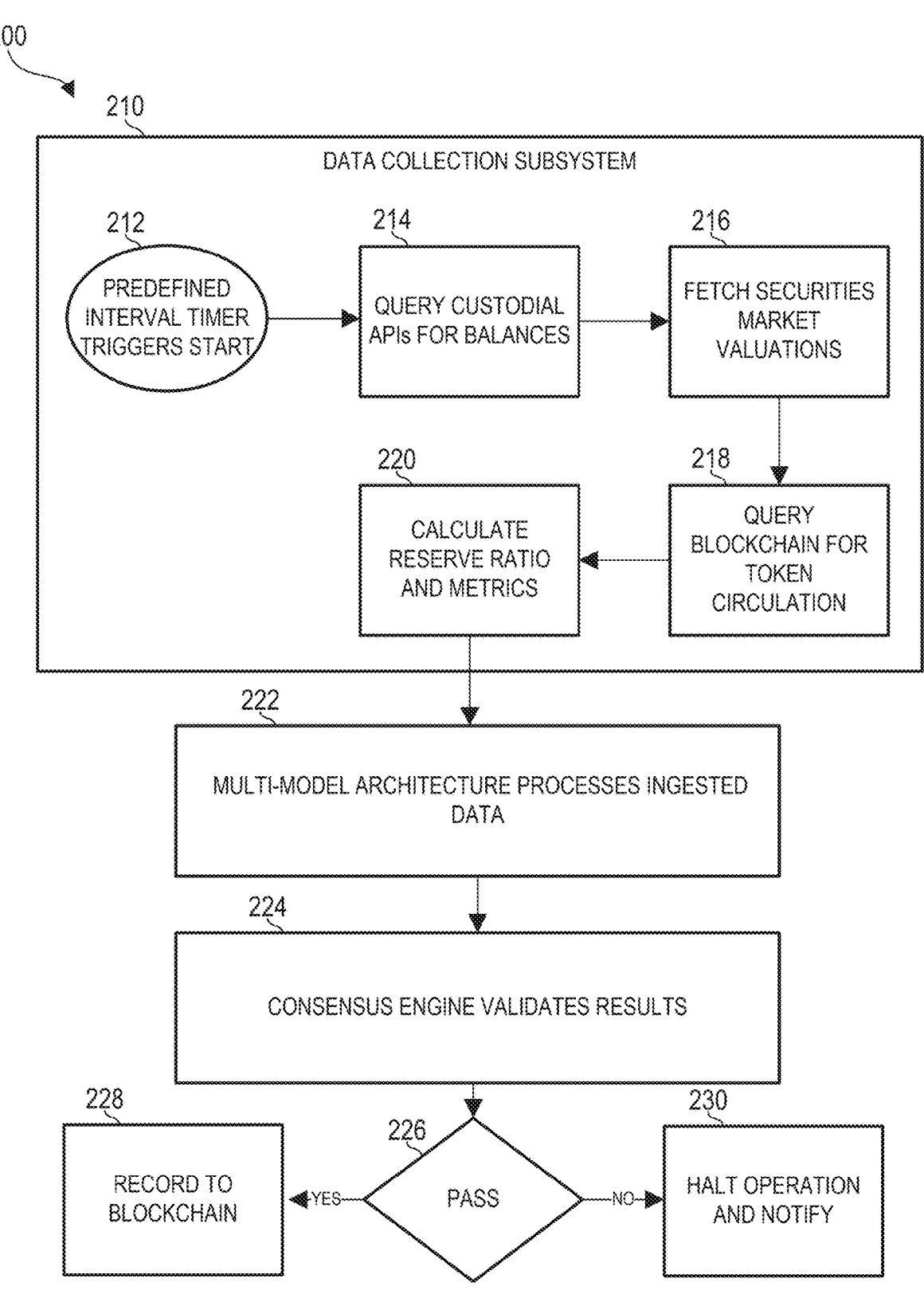
FIG. 2 is a flowchart illustrating the continuous audit cycle from data collection through blockchain settlement for a digital stablecoin.

FIG. 2 depicts continuous audit cycle 200 from data collection through blockchain settlement for a digital stablecoin, with the data collection subsystem 210 being shown in detail. As shown, the data collection subsystem 210 can facilitate several process steps 212-220, and can continuously operate at a predefined interval timer 212 that triggers the start of the auditing process. At 214, the subsystem can query custodial bank APIs to retrieve real-time balance information for all reserve accounts, including cash accounts and securities custody accounts. Then, at 216, current market valuations can be fetched from securities pricing feeds for authorized reserve assets, such as U.S. Treasury securities and T-Bills. At 218, blockchain networks can be queried to determine the total supply of stablecoin tokens currently in circulation across all addresses. At 220, the reserve ratio can be calculated, for example, by summing cash balances and the current market value of all securities holdings, and then dividing the total reserve value by total token circulation. The subsystem 210 can then package all the collected data into a standardized format for transmission to the AI ensemble 222, ensuring concurrency-ready inputs for model execution.

The data collection subsystem 210 runs at the predefined interval timer 212, which can be less than or equal to about one minute (e.g., a continuous 60-second cycle) and, in all cases, less than one hour. Each collection cycle can complete within less than one minute, including data ingestion, calculation of reserve value and reserve ratio, and packaging of standardized outputs for the AI ensemble 222, thereby enabling near-real-time analysis. Using this data, a multi-model architecture can process the ingested data (i.e., AI ensemble) 222 and a consensus engine can validate the results 224. Generally, and as will be further described, based on the processed data, if the audit checks pass 226, the audit results can be recorded to one or more blockchains 230. However, if the audit checks fail, the process can halt operations 230 (i.e., rejecting execution of at least one pending token transaction) and provide a notification to one or more parties and/or a system orchestrator.

Figure 3:
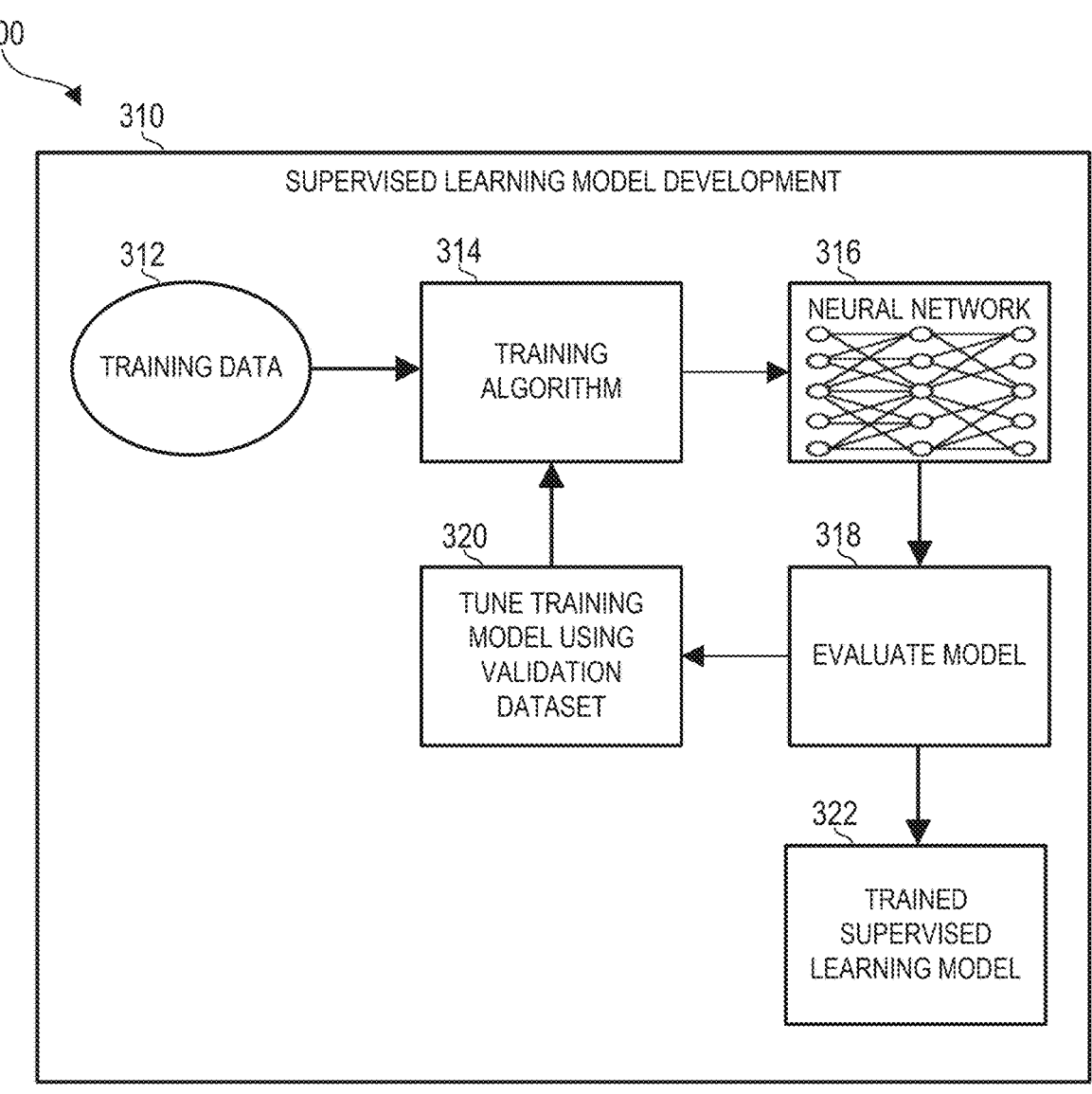
FIG. 3 is a flowchart illustrating the development of a supervised learning model for implementation into an audit cycle of a digital stablecoin.

FIG. 3 is a diagram 300 that depicts the development 310 of a supervised learning model 322 for implementation into an audit cycle of a digital stablecoin. As shown, the supervised learning model 322 can be implemented as a neural network configured to learn a decision function for classifying reserve states, such as by classifying them as "legitimate" or "suspicious." As shown, training data 312 can be provided to a training algorithm 314. The training data sources can include: (i) historical fraud cases from financial industry databases that exhibit patterns of reserve manipulation, temporary fund movements, and accounting irregularities; (ii) legitimate operational patterns from compliant stablecoin operators and traditional financial institutions reflecting normal reserve fluctuations, redemption activity, and market-driven movements; and (iii) synthetic fraud scenarios produced via adversarial generation techniques to cover novel or evolving fraud behaviors not yet observed in production. Each data instance can be annotated with a label indicating whether the reserve state is legitimate or suspicious, thereby enabling supervised learning.

A neural network 316 can be trained based on the training data 312 and the training algorithm 314, and the resulting model can be evaluated at 318. Based on these evaluations, the model can be fine-tuned and retrained 320 as necessary using a validation dataset to produce a trained supervised learning model 322 that achieves a target level of accuracy, robustness, and stability with respect to reserve classification tasks. The neural network 316 can be trained using various techniques known in the art, including being trained using backpropagation with stochastic or mini-batch gradient descent, optimized with methods like Adam/RMSProp/

Momentum and appropriate losses, regularized via dropout and L1/L2 weight decay, supported by data preprocessing/augmentation, and/or guided by validation with early stopping and learning-rate schedules. The resulting trained supervised learning model 322 can be configured to compute a fraud probability based on labeled transaction features and known fraud patterns.

Figure 4:
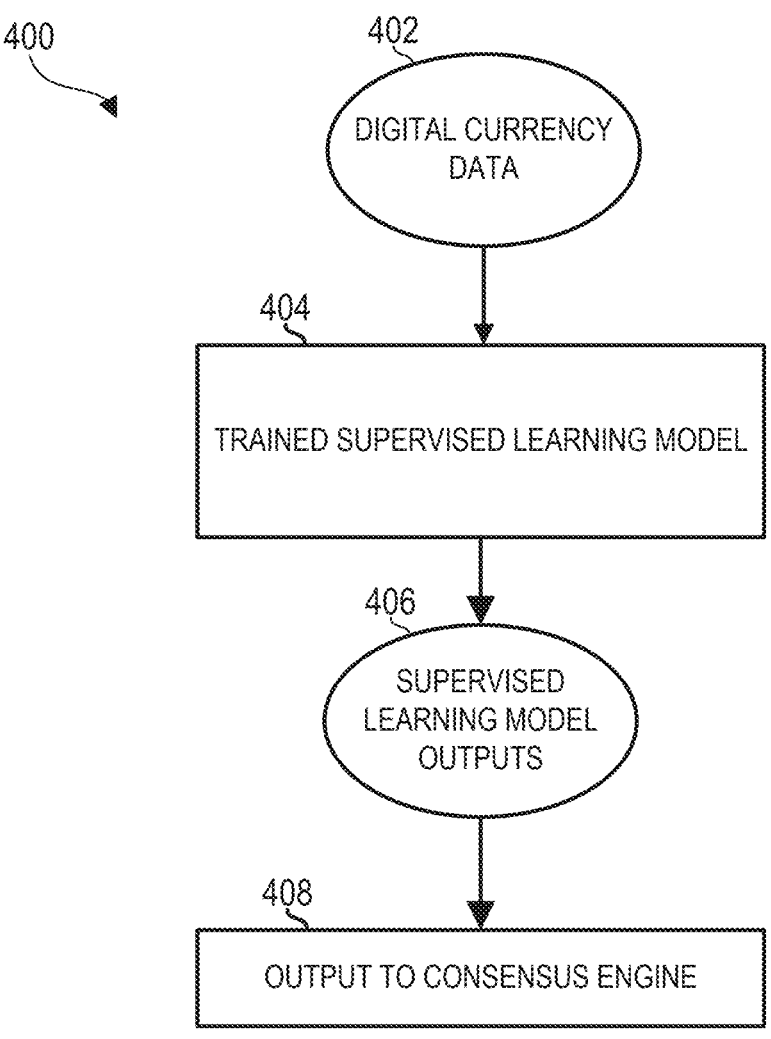
FIG. 4 is a diagram illustrating an architecture for a supervised learning model for implementation into an audit cycle of a digital stablecoin.

FIG. 4 depicts an architecture 400 for a supervised learning model for implementation into an audit cycle of a digital stablecoin. As shown, a trained supervised learning model 404 can receive current reserve data and other digital currency data 402 from a data acquisition subsystem, such as reserve balances, token circulation, reserve ratio, and transaction patterns. Upon receiving such inputs, the supervised learning model 404 can utilize the neural network and produce various outputs 406, such as a classification output (e.g., an indication of whether the current reserve state is "LEGITIMATE" or "SUSPICIOUS"), a confidence score (e.g., ranging from 0 to 1) that represents the model's certainty, and/or feature-importance indications that identify the input attributes that most influenced the classification under the current model parameters. These outputs can be provided to a consensus engine 408, and logged, audited, and used to drive automated or human-in-the-loop workflows. For example, if the supervised learning model 404 outputs a "SUSPICIOUS" classification, or if the confidence score falls below a configurable threshold (e.g., 0.95), the model can generate an alert flag that is programmatically forwarded to a consensus engine. The consensus engine can receive the alert flag together with the associated confidence score and feature-importance indications to facilitate decisioning. In some implementations, the supervised learning model architecture can include an ensemble of a gradient boosting classifier and a deep neural network.

Figure 5:
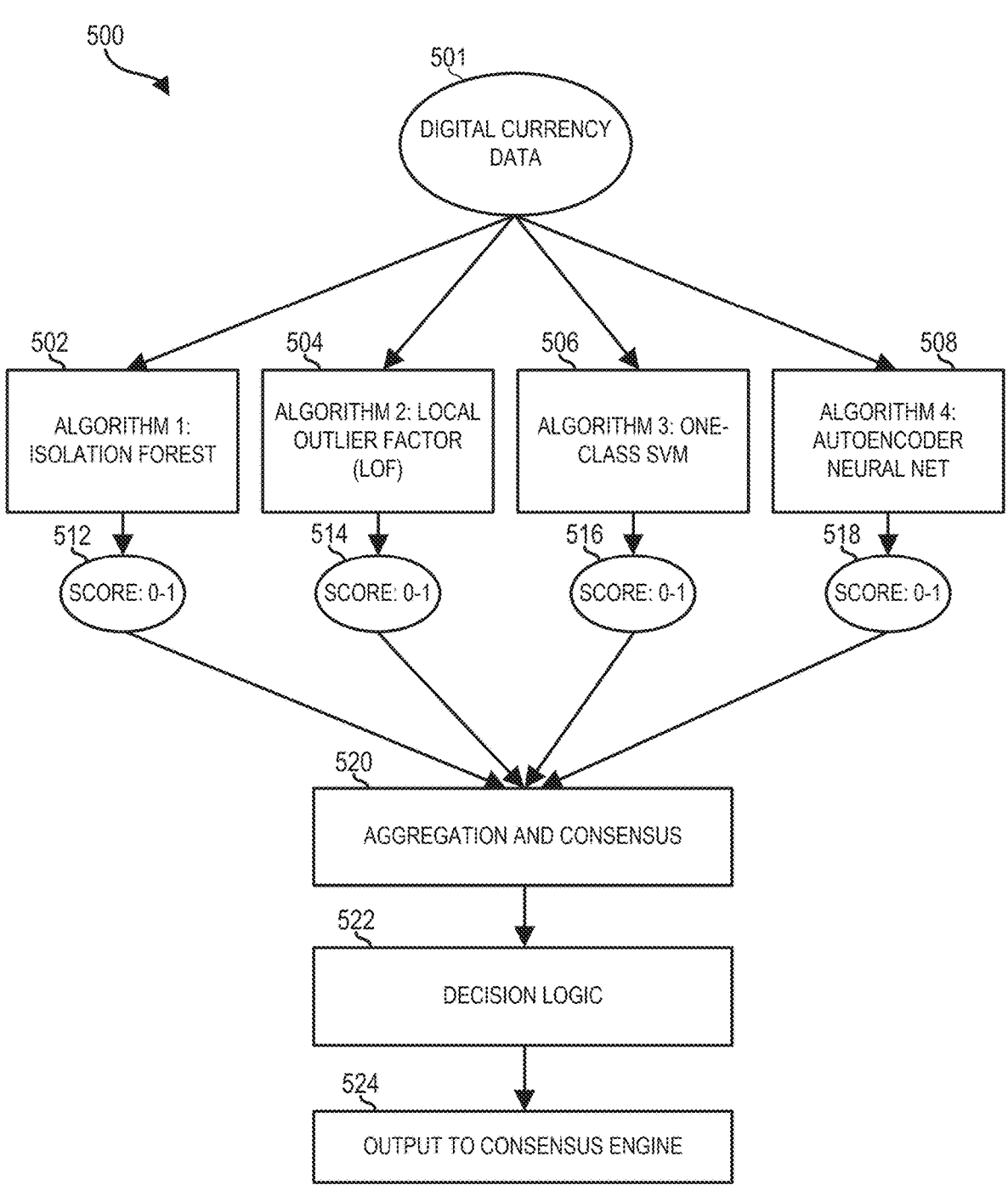
FIG. 5 is a diagram illustrating an architecture for an unsupervised anomaly detection model for implementation into an audit cycle of a digital stablecoin.

FIG. 5 depicts an architecture 500 for an unsupervised anomaly detection model for implementation into an audit cycle of a digital stablecoin. The unsupervised anomaly detection model can be configured to identify unusual or novel patterns in observed reserve and token circulation behavior without reliance on labeled training data, thereby enabling detection of fraud techniques not represented in historical examples. As shown, the unsupervised anomaly detection model can operate as a parallel ensemble of multiple anomaly detection algorithms 502, 504, 506, 508 that utilize digital currency data 501 to compute complementary indicators of deviation from a learned baseline of normal multi-variate behavior. An isolation forest algorithm 502 can construct randomized decision trees to isolate individual observations, with anomalies identified as those requiring fewer splits to isolate relative to typical patterns. A local outlier factor (LOF) algorithm 504 can compute the local density of each observation and compare it to the densities of its nearest neighbors, flagging observations with substantially lower relative density as anomalies. A one-class support vector machine (SVM) algorithm 506 can learn a decision boundary surrounding normal observations in feature space, classifying observations outside the boundary as anomalies. An autoencoder neural network algorithm 508 can learn a compressed representation of normal behavior via an encoder-decoder architecture and identify anomalies as observations exhibiting elevated reconstruction error. It should be readily appreciated that the algorithms 502-508 that form the unsupervised anomaly detection model are mere examples, and additional or alternative algorithms can be utilized in some implementations.

Each algorithm 502-508 can be configured to produce a corresponding anomaly score 512-518, and the unsupervised anomaly detection model can execute all four algorithms 502-508 in parallel to produce various aggregate metrics 520, including an aggregated anomaly score derived from the ensemble outputs, an algorithm agreement metric indicating the count of algorithms that concur in flagging an observation as anomalous, and/or an anomaly type characterization identifying feature dimensions exhibiting atypical patterns. In some implementations, the unsupervised anomaly detection model can rely on decisioning logic 522 to generate an alert flag when the aggregated anomaly score exceeds a predefined threshold or when multiple algorithms agree in flagging the observation. Such alert flags can then be provided to a consensus engine 524 for final audit status determination.

Figure 6:
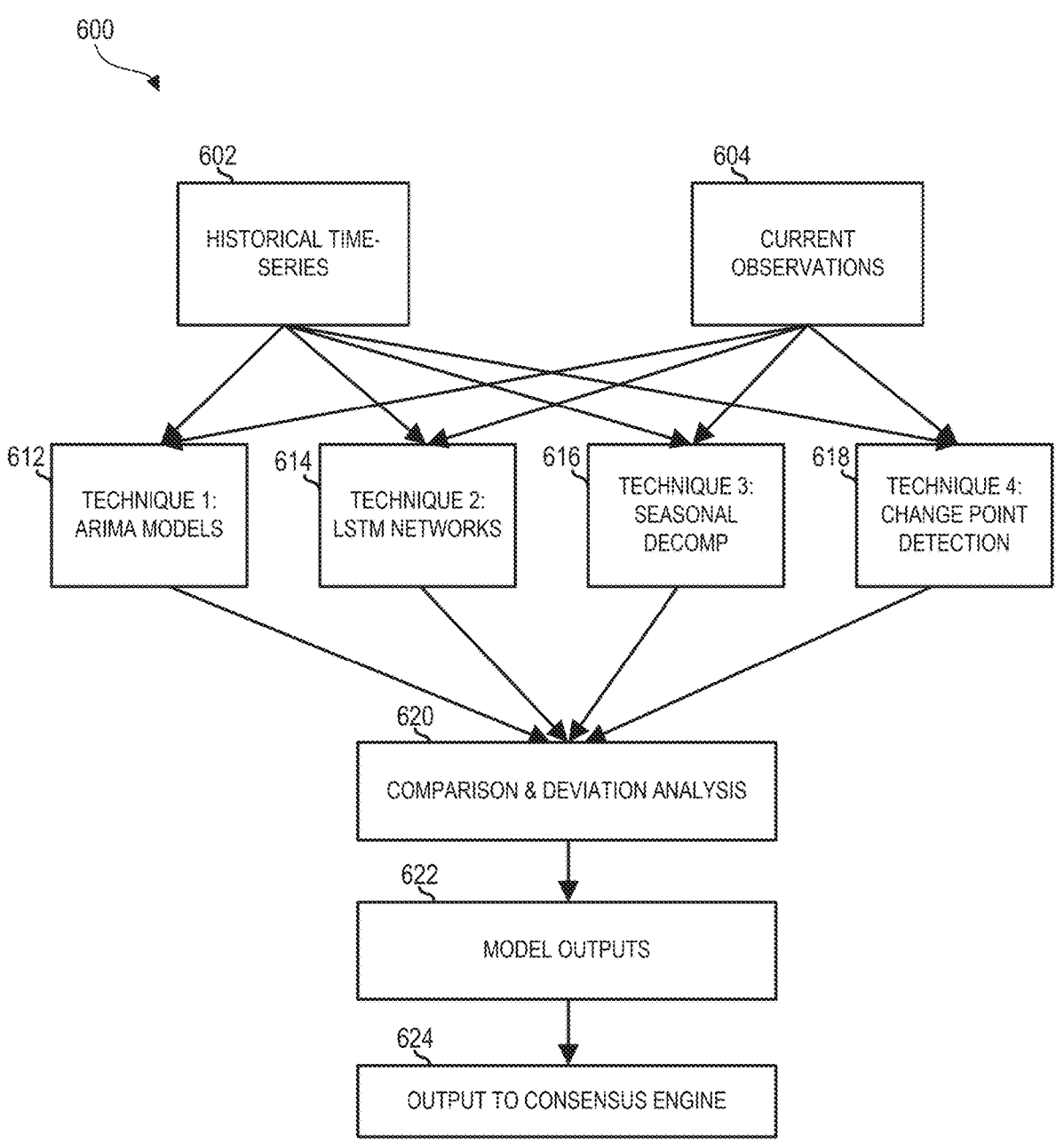
FIG. 6 is a diagram illustrating an architecture for a time-series analysis model for implementation into an audit cycle of a digital stablecoin.

FIG. 6 depicts an architecture 600 for a time-series analysis model for implementation into an audit cycle of a digital stablecoin. The time-series analysis model can be generally configured to monitor temporal patterns in reserve-related data to detect unusual trends, cyclical patterns, or sudden changes that can indicate manipulation. In operation, the time-series analysis model can maintain and continuously update historical time-series data streams 602, which can include, for example, total reserve value over time, token circulation over time, reserve ratio over time, individual asset balances over time, and transaction volumes over time. The time-series analysis model can also utilize current observations 604, including real-time data points, recent audit cycles, and updated metrics when performing the audit analysis. Using these inputs, the time-series analysis model can employ multiple forecasting and decomposition techniques, including one or more of: auto-regressive integrated moving average (ARIMA) models 612 to predict future values based on historical patterns and to surface significant deviations from predicted trajectories, long short-term memory (LSTM) neural networks 614 to learn complex temporal dependencies in sequential data and to forecast expected values while flagging significant departures, seasonal decomposition analysis 616 to separate trend, seasonal, and residual components and to identify unusual spikes in the residual component that are not explained by normal periodicity, and change point detection 618 to identify moments where the statistical properties of the time series change abruptly, potentially indicating intentional manipulation or structural breaks.

The time-series analysis model can perform comparison and deviation analysis 620 on the outputs of the various models to produce forecast predictions with associated confidence intervals. The model outputs 622, such as deviation scores that quantify distances between observed values and expected predictions, change point alerts when statistical shifts are detected, and trend direction and acceleration metrics that characterize trend health across micro-pattern, daily, weekly, and monthly horizons, can then be provided to a consensus engine 624. Using this framework, the time-series analysis model can generate alerts, for example, when current values fall outside prediction confidence intervals or when change points are detected. These alerts, along with additional outputs, are consumable by the broader audit consensus engine to inform audit status determinations consistent with the techniques described herein.

Figure 7:
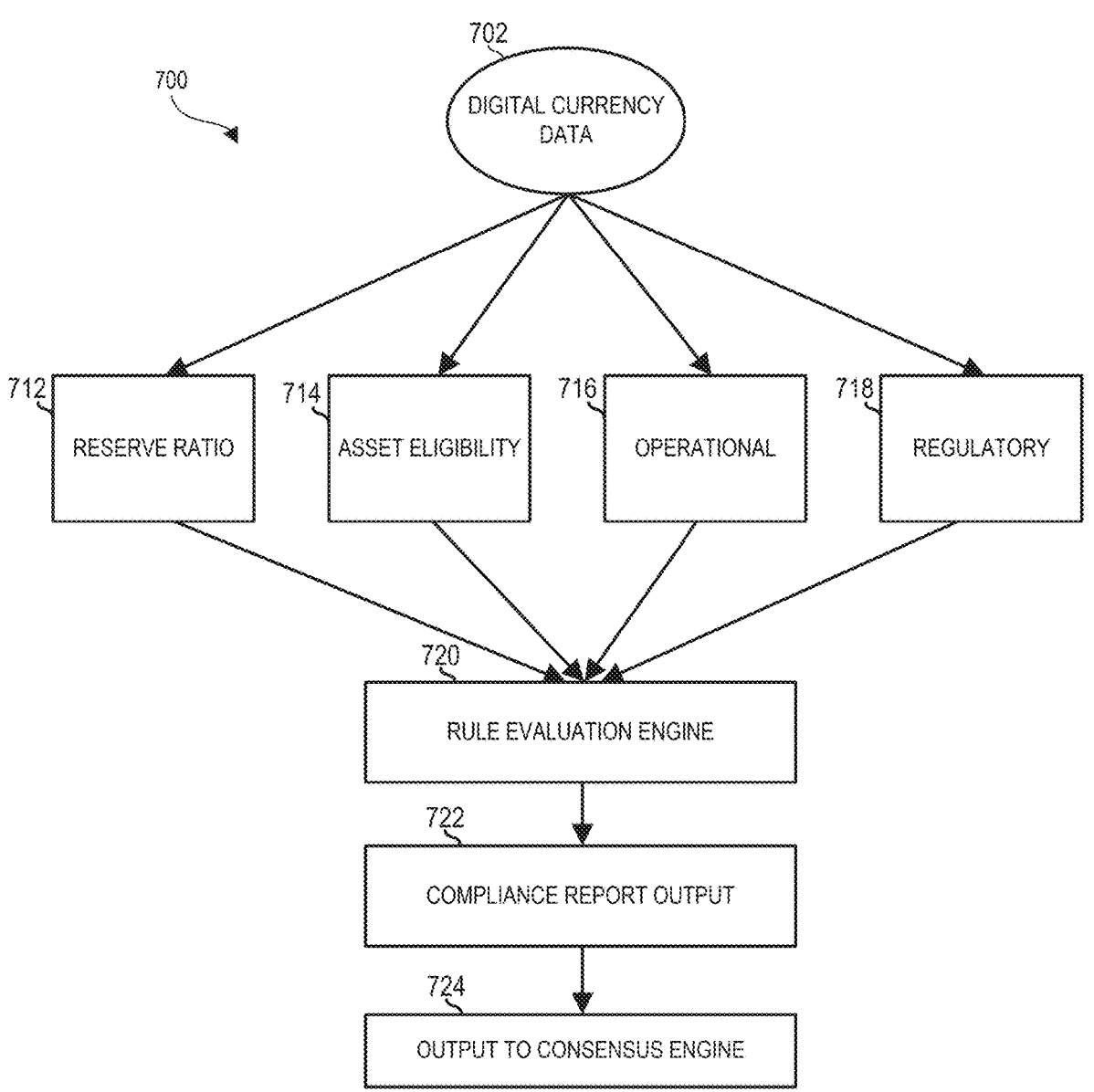
FIG. 7 is a diagram illustrating an architecture for a rule-based compliance engine for implementation into an audit cycle of a digital stablecoin.

FIG. 7 depicts an architecture 700 for a rule-based compliance engine for implementation into an audit cycle of a digital stablecoin. The rule-based compliance engine can encode regulatory requirements and business logic as explicit, non-probabilistic rules to provide deterministic compliance checking within the continuous audit pipeline. As shown, the rule-based compliance engine can ingest digital currency data 702 and implement rules spanning multiple categories to enforce reserve sufficiency, asset quality, operational timeliness, and regulatory obligations. In a first category directed to reserve ratio constraints 712, the rule-based compliance engine can require, for example, that the total reserve value be greater than or equal to a factor of the token circulation (e.g., greater or equal to 1.0 times the token circulation), that liquid reserves, such as cash, be greater than or equal to a second factor of the token circulation (e.g., greater or equal to 0.2 times the token circulation), and/or that any single asset is prohibited from representing more than a specified portion (e.g., fifty percent) of total reserves, thereby enforcing diversification.

In a second category directed to asset eligibility 714, the rule-based compliance engine can, for example, require that all reserve assets be sourced from an approved whitelist, mandate that government securities included in reserves have a maturity less than or equal to twelve months, and/or require that securities be maintained in segregated custody accounts. In a third category directed to operational policies 716, the rule-based compliance engine can, for example, require that reserve data be refreshed and validated within a specified time period (e.g., a sixty-second cycle), mandate that any failed verification immediately trigger automatic alerts, and/or require that audit results be published to the blockchain within a specified period of time (e.g., five seconds) of determination to ensure near-real-time finality. In a fourth category directed to regulatory compliance 718, the rule-based compliance engine can, for example, require adherence to governmental regulations (e.g., GENIUS Act requirements), mandate maintenance of a complete audit trail for a specified period of time (e.g., seven years), and/or require reporting of any violations to a designated compliance officer within a specified period of time (e.g., sixty seconds).

The rule-based compliance engine can apply a rule evaluation engine 720 to evaluate each rule against current reserve data and token circulation data obtained from a plurality of sources to produce a compliance report output 722 that can be provided to a consensus engine 724. These outputs can include, for example, a pass/fail status for each rule, a list of violated rules annotated with severity levels, a compliance score representing a percentage of rules passed during the cycle, and recommended remediation actions tailored to the detected violations. In some implementations, upon detection of any rule violation, the rule-based compliance engine can generate an immediate alert flag that is passed to the consensus engine, granting the rule-based compliance engine veto priority in the audit determination consistent with the deterministic nature of the constraints.

Figure 8:
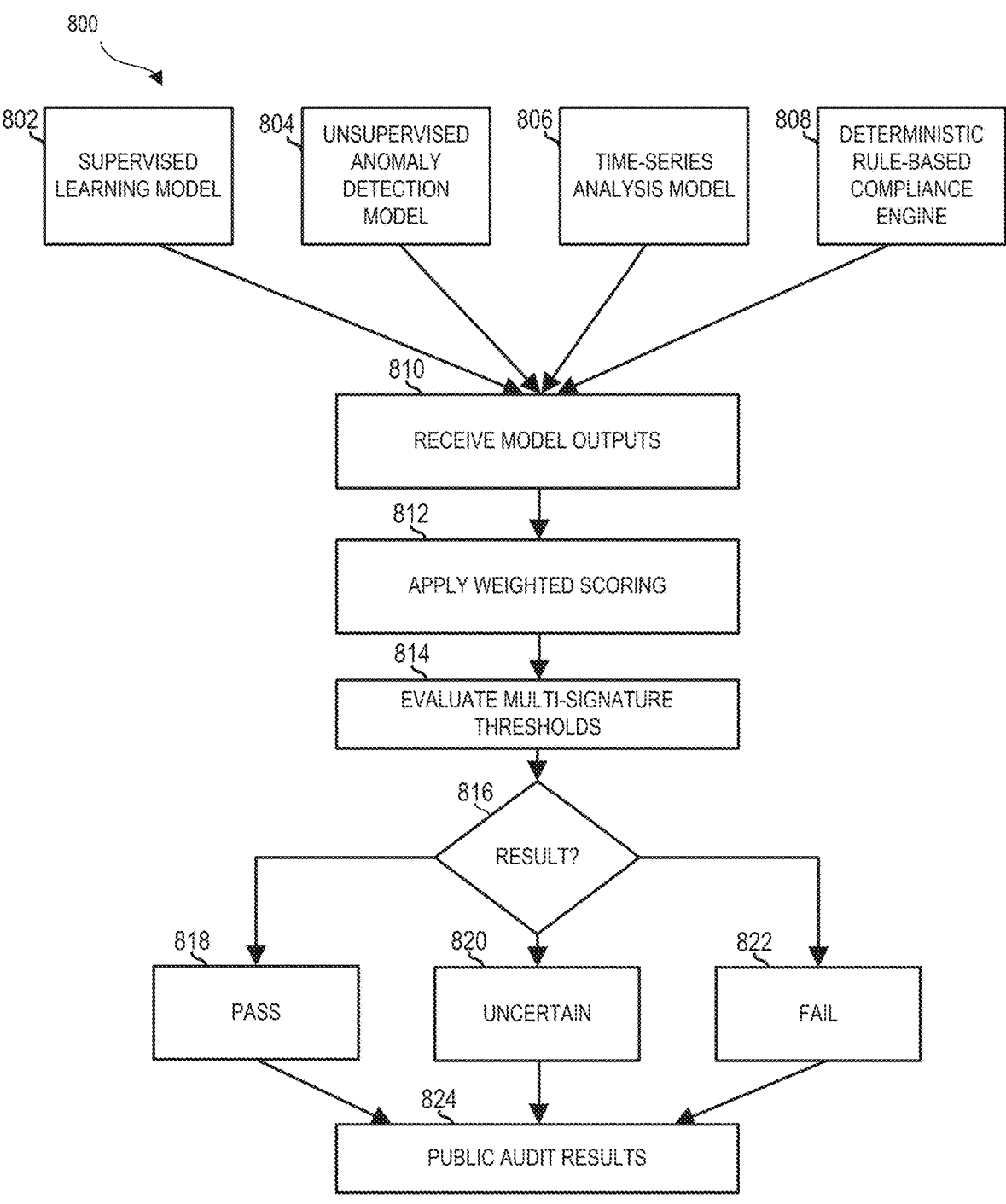
FIG. 8 is a diagram illustrating an architecture for a consensus engine decision logic and multi-signature validation process for implementation into an audit cycle of a digital stablecoin.

FIG. 8 depicts an architecture 800 for a consensus engine decision logic and multi-signature validation process for implementation into an audit cycle of a digital stablecoin. The consensus engine can aggregate outputs produced in parallel by an ensemble of multiple distinct models, as detailed herein, and can apply a multi-signature decision procedure to determine an audit status, with veto priority granted to the deterministic rule-based compliance engine upon detection of any non-probabilistic regulatory or policy violation. In operation, the consensus engine can receive, for each audit cycle, model-specific outputs at 810 from, for example, a supervised learning model 802 providing a classification or fraud probability together with an associated confidence score, an unsupervised anomaly detection model 804 providing an anomaly score together with an indication of algorithmic agreement across multiple anomaly detectors, a time-series analysis model 806 providing a deviation or trend-health score together with identified change points, and a rule-based compliance engine 124 providing a compliance score together with any enumerated violated rules.

The consensus engine architecture can apply weighted scoring at 812 across the plurality of models by assigning a weight to each model based on historical accuracy and computing a weighted average verification score. For example, a weight of 30% can be applied for the supervised learning model 802, 25% for the unsupervised anomaly detection model 804, 20% for the time-series analysis model 806, and 25% for the compliance engine 808, while preserving the compliance engine's veto priority. The consensus engine can then evaluate multi-signature thresholds 814 to determine a result 816 that requires agreement among independent verification methods, such that verification passes 818 if a minimum number (e.g., three of the four) of models indicate a pass condition under their respective criteria and fails 822 if that condition is not met. In some instances, verification is treated as uncertain 820 and escalated for manual review (e.g., if the models are split evenly). In all cases, any hard violation identified by the rule-based compliance engine 808 can be set to override probabilistic consensus and control the audit status.

Based on these aggregated outputs and thresholds, the consensus engine 130 generates a final audit result 824 that can include an audit status (e.g., PASS, CAUTION, ALERT, or HALT), a numerical confidence score (e.g., ranging from 0-1) quantifying consensus strength, a consensus level indicating the number of models in agreement, and alert flags enumerating issues detected by any model. The consensus engine can then initiate workflow actions in accordance with the audit status, which can include, for a PASS result, proceeding to blockchain settlement and generating and recording a cryptographic attestation with near-real-time finality. For a CAUTION or UNCERTAIN result, the consensus engine can be configured to trigger a manual review workflow and continuing operations with enhanced monitoring while preserving audit artifacts for subsequent anchoring. In the event of an ALERT or HALT result, the consensus engine can trigger emergency notifications, rejecting or halting execution of pending token transactions, and notifying compliance personnel. This multi-signature approach can be used to enforce consensus across multiple independent verification methods so that no single-model failure can compromise audit integrity. This approach can also ensure that deterministic compliance violations take precedence over probabilistic signals in determining the audit status.

Figure 9:
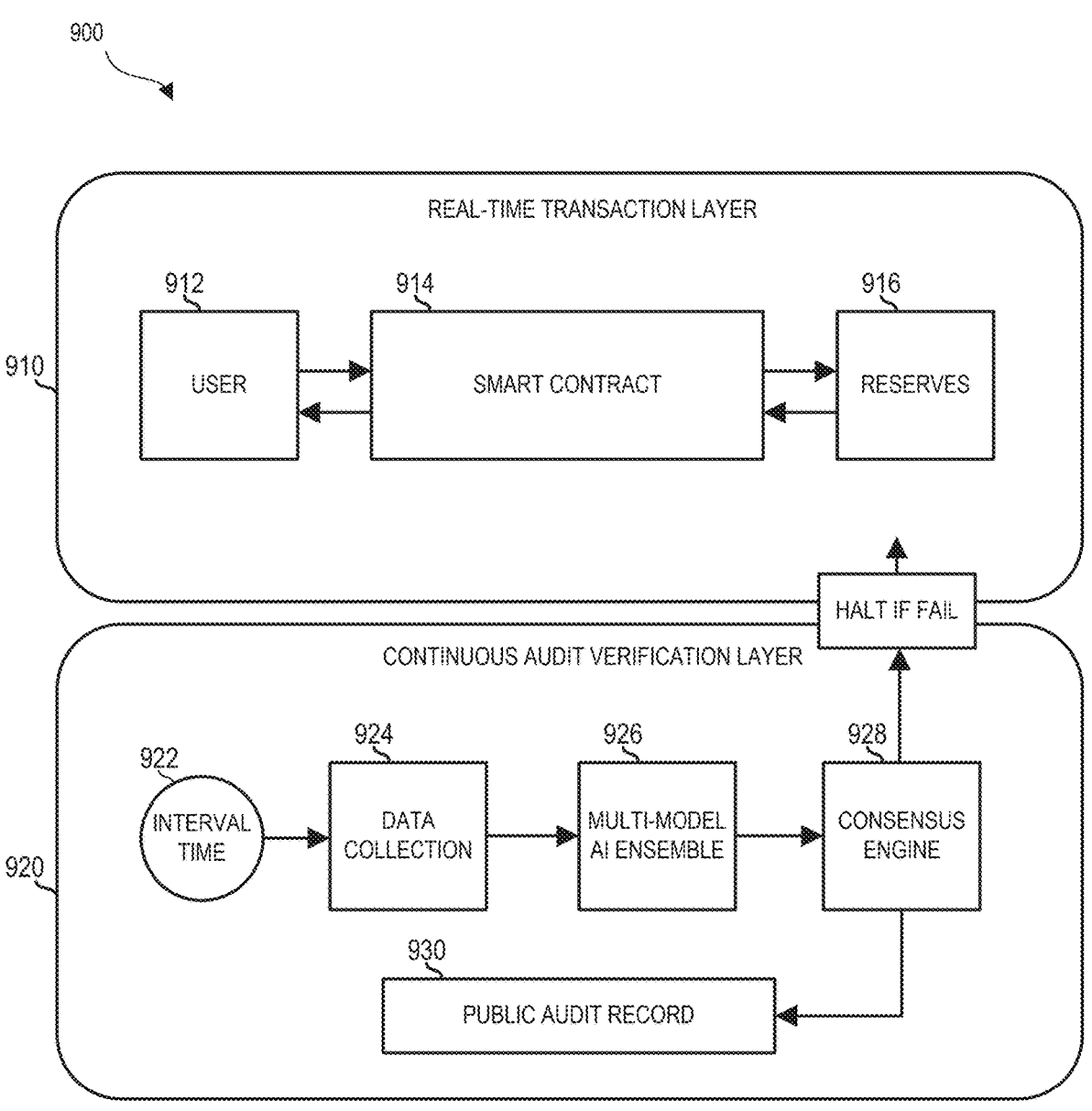
FIG. 9 is a diagram illustrating a dual layer architecture for auditing a digital stablecoin, with a real-time transaction layer and an underlying continuous audit verification layer.

FIG. 9 depicts a dual layer architecture 900 for auditing a digital stablecoin, with a real-time transaction layer 910 and an underlying continuous audit verification layer 920. In general, a dual blockchain settlement subsystem can record audit results on two separate blockchain networks, delivering real-time operational efficiency while anchoring integrity with ultimate security assurances. For example, the system can rely on IBVM blockchain 914 for high-frequency settlement and Bitcoin blockchain (not depicted) for daily, immutable security checkpoints, ensuring transparency, verifiability, and tamper resistance across both layers. This dual-layer architecture 900 permits real-time transaction processing at high throughput, continuous automated verification on short-time intervals, comprehensive transparency through public records, independent verification by any third party, and an immutable audit trail across both blockchains.

The transaction layer 910 and audit layer 920 are separate but synchronized systems. For instance, the transaction layer 910 can execute transactions continuously in real time, minting and burning via smart contracts on the IBVM blockchain 914 at up to 10,000 transactions per second, thereby achieving two-second finality. Meanwhile the audit layer 920 can operate on fixed, one-minute intervals, verifying the aggregate state using an ensemble of AI models, and producing one system-wide verification per minute, for example. If the audit layer detects a FAIL status, the transaction layer can be prevented from proceeding, with smart contracts automatically pausing, minting being prohibited, redemptions continuing for user protection, emergency alerts being issued, and manual intervention being potentially requested. The system can be configured such that transactions resume only once the audit status returns to PASS. This separation ensures that throughput and responsiveness do not compromise oversight while maintaining uninterrupted user protections.

Generally, in the depicted example, when a user 912 purchases USDi, the process begins with the user 912 sending fiat currency (USD) to the system. Upon confirmation from the payment processor, a smart contract 914 automatically mints the corresponding amount of USDi and transfers it to the user's 912 blockchain wallet. The smart contract 914 then allocates the designated percentage of the received USD—such as 100% or the required reserve ratio—to purchase reserves (e.g., U.S. Government Treasury securities) 916 via a custodial interface. The complete transaction is recorded on the IBVM blockchain and reaches finality within about two seconds. For redemption, the user 912 sends USDi to the smart contract 914, which verifies the user's 912 balance and ownership, permanently burns the received tokens, and reduces the total USDi circulation accordingly. The smart contract 914 then initiates a fiat payment to the user 912 and, if necessary, liquidates a proportional share of Treasury securities 916. The redemption is recorded on the IBVM blockchain and finalizes within about two seconds. All transaction details—including timestamps, pseudonymous wallet addresses, amounts minted or burned, updated circulation totals, reserve asset purchases or redemptions, and the full audit trail—can be immutably stored on the IBVM blockchain. In this manner, the transaction layer 910 can operate continuously and throughput up to 10,000 transactions per second.

Independent of the real-time transaction layer processing, the continuous audit verification layer 920 can execute verification cycles at set interval times 922 (e.g., every sixty seconds) to confirm ongoing reserve adequacy and systemic integrity. The audit cycle begins with the data collection subsystem 924 querying the current state, including, in this example, the total USDi circulation from IBVM (net of minting and burning), total USD cash balances from custodial banking APIs, and current market values for all Treasury holdings from pricing feeds. Using these inputs, the system can calculate the total reserve value and the reserve ratio by dividing total reserves by total circulation. A multi-model ensemble of AI models 926—supervised for known fraud patterns, unsupervised for anomaly detection, time-series for temporal dynamics, and rule-based for compliance verification—can then process the data in parallel. A consensus engine 928 can validate model outputs via multi-signature logic, after which a cryptographic audit record 930 with the audit timestamp can be generated, including information such as the total USDi in circulation, itemized reserve values, the reserve ratio, the PASS/FAIL/UNCERTAIN status, all model outputs, and the relevant cryptographic signatures. The public audit record can be encrypted and written to the IBVM blockchain. This high-frequency cadence provides regulators and users with near real-time visibility into system health, with confirmations and finality achieved within seconds. Additionally, at a set period of time (e.g., every twenty-four hours), the full set of audit records for the preceding time period can be aggregated into a Merkle tree and its root can be posted to the Bitcoin blockchain, providing a tamper-evident, daily summary of verification activity.

Because both transaction records and audit records are recorded on public blockchains, any interested party can independently verify the system's integrity without relying on private disclosures. An independent verifier can access the IBVM blockchain to read all minting and burning transactions, compute net circulation by subtracting total burned from total minted and compare that figure against published sixty-second audit records. The verifier can also confirm that the reserve ratio remains at or above 1.0, indicating full backing. Using the Bitcoin blockchain, the verifier can validate the Merkle root against reconstructed hashes of the day's audit records. This workflow enables reconstruction of the complete audit history and verification of cryptographic integrity from both chains, delivering transparency and assurance at scale. Together, these settlement layers combine real-time transparency on IBVM with periodic, high-assurance anchoring on Bitcoin.

While IBVM and Bitcoin are discussed with respect to the blockchains used in FIG. 9, it should be appreciated that alternative implementations can substitute other high-throughput transaction layer blockchains in combination with Bitcoin, such as Ethereum plus Bitcoin or Solana plus Bitcoin, provided the real-time transaction layer blockchain supports settlement at the required cadence. The consensus engine 928 can also employ different multi-signature or weighted voting schemes, such as 2-of-4, 4-of-4, or threshold-based designs tailored to risk and operational requirements. Moreover, the multi-model AI ensemble 926 can be expanded with additional models, including, for example, graph neural networks for transaction pattern analysis, reinforcement learning for adaptive thresholding, or natural language processing for market and sentiment monitoring. Moreover, the verification interval time can be tuned to operational needs and network capacity, ranging, for example, less than ten minutes, or, more specifically, from thirty to one hundred twenty seconds, while preserving the same assurance model.

FIG. 10 depicts a method 1000 for continuously verifying reserve backing of a digital token on a blockchain. The method 1000 can be implemented by one or more computing devices. At 1002, at a predefined interval, a parallel analysis pipeline can be executed that ingests current reserve data and token circulation data from a plurality of sources. At 1004, the ingested data can be processed concurrently through an ensemble of four distinct models. The models can include: (i) a supervised learning model configured to compute a fraud probability based on labeled transaction features and known fraud patterns; (ii) an unsupervised anomaly detection model configured to compute an anomaly score by comparing observed multi-variate behavior to a learned baseline; (iii) a time-series analysis model configured to compute trend health and to forecast reserve ratio trajectories across multiple temporal horizons; and (iv) a deterministic rule-based compliance engine configured to evaluate non-probabilistic regulatory and policy constraints. At 1006, outputs of the supervised learning model, the unsupervised anomaly detection model, and the time-series analysis model can be aggregated in a consensus engine to determine an audit status, while granting veto priority to the rule-based compliance engine upon detection of a violation. At 1008, a cryptographic attestation can be generated characterizing the audit status. At 1010, the cryptographic attestation can be recorded to a first blockchain with near-real-time finality. At 1012, a plurality of cryptographic attestations can be periodically batched and a Merkle root of the batch can be anchored onto a second blockchain to provide immutable checkpointing of audit results.

Figure 11:
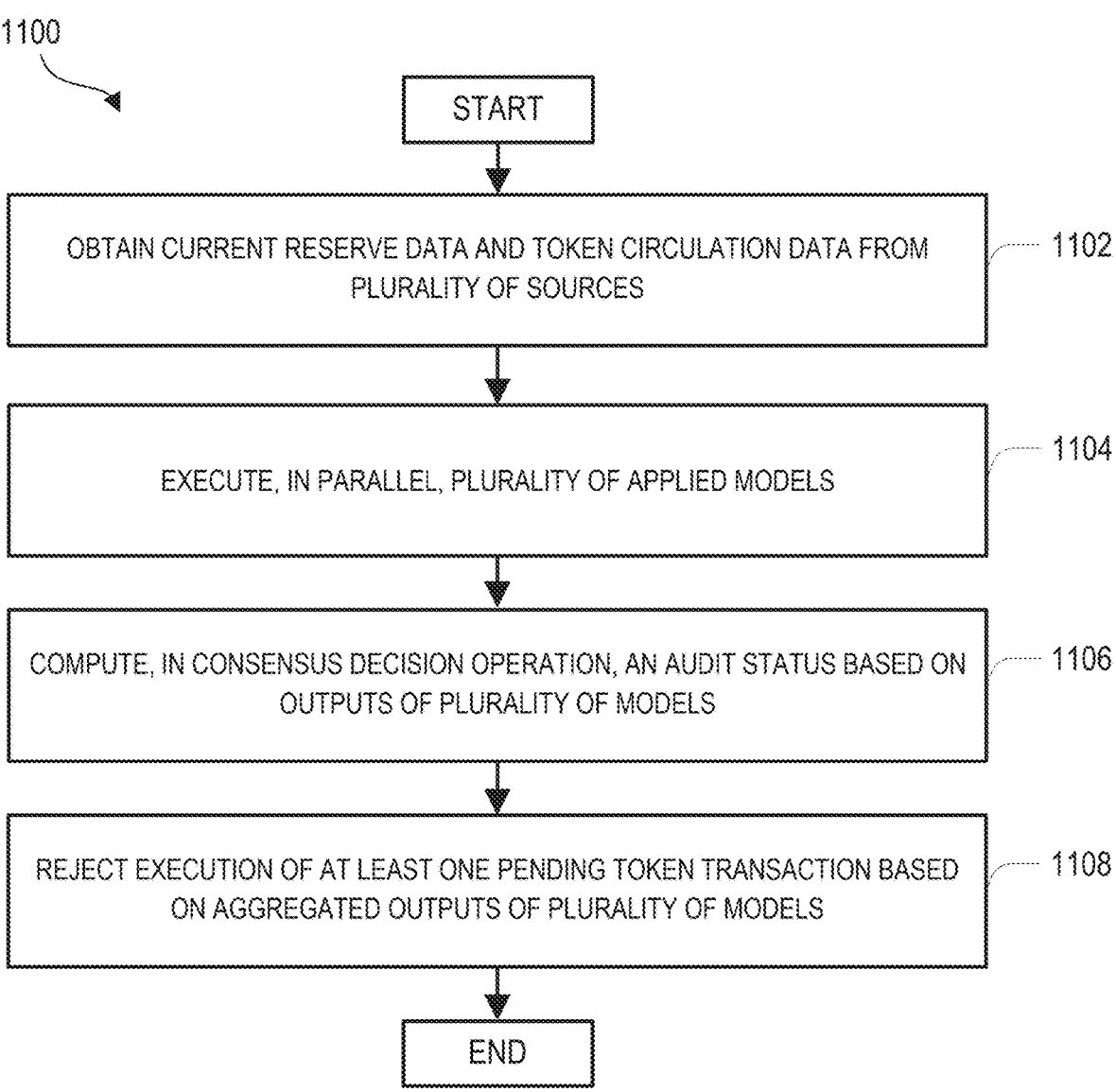
FIG. 11 is a second process flow diagram illustrating aspects relating to a method of rejecting execution of at least one pending token transaction on a blockchain using an ensemble of AI models.

FIG. 11 depicts a method 1100 of rejecting execution of at least one pending token transaction on a blockchain using an ensemble of AI models. At 1102, current reserve data and token circulation data can be obtained from a plurality of sources. At 1104, a plurality of applied models can be executed, in parallel. The models can include: a deterministic rule-based compliance process that outputs constraint evaluations with hard pass/fail determinations, and at least one of the following: a supervised learning model configured to compute a fraud probability based on labeled transaction features and known fraud patterns, an unsupervised anomaly detection model configured to compute an anomaly score by comparing observed multi-variate behavior to a learned baseline, or a time-series analysis model configured to compute trend health and to forecast reserve ratio trajectories across multiple temporal horizons. At 1106, an audit status can be computed in a consensus decision operation based on outputs of the plurality of models. At 1108, execution of at least one pending token transaction can be rejected based on the aggregated outputs of the plurality of models.

FIG. 12 depicts a method 1200 for verifying reserve backing of a digital token on a blockchain. The method 1200 can be implemented by one or more computing devices. At 1202, current reserve data and token circulation data can be ingested from a plurality of sources. At 1204, the ingested data can be processed concurrently through an ensemble of four distinct models. The four distinct models can include: (i) a supervised learning model configured to compute a fraud probability based on labeled transaction features and known fraud patterns; (ii) an unsupervised anomaly detection model configured to compute an anomaly score by comparing observed multi-variate behavior to a learned baseline; (iii) a time-series analysis model configured to compute trend health and to forecast reserve ratio trajectories across multiple temporal horizons; and (iv) a deterministic rule-based compliance engine configured to evaluate non-probabilistic regulatory and policy constraints. At 1206, outputs of the supervised learning model, the unsupervised anomaly detection model, and the time-series analysis model can be aggregated in a consensus engine to determine an audit status, while granting veto priority to the rule-based compliance engine upon detection of a violation. At 1208, execution of at least one pending token transaction can be rejected based on the aggregated outputs of the four distinct models.

Some or all aspects of the workflows or other operations described herein can be implemented by autonomous agents. In this context, agents, or AI agents, are autonomous software entities that utilize advanced artificial intelligence techniques—including LLMs, reinforcement learning (including contextual bandits), planning and scheduling algorithms, and other machine learning methods—to perceive their environment (potentially across text, images, audio, video, sensor streams, and structured data), interpret complex information, make context-aware decisions under uncertainty, and execute actions to achieve objectives defined by human operators or higher-level policies.

Such agents can orchestrate end-to-end pipelines by routing requests, performing semantic task decomposition, and coordinating data flow among heterogeneous components (e.g., rule engines, retrieval systems, analytics services, and specialized ML models). They can dynamically select and parameterize models (semantic routing, few-shot configuration, prompt/program synthesis), manage tool invocation (APIs, databases, vector stores, message queues, Robotic Process Automation (RPA), robotic/IoT actuators), and adapt behavior based on intermediate results, user feedback, or changing requirements. Agents can maintain short- and long-term memory, ground reasoning via retrieval-augmented generation, and update knowledge bases while enforcing data governance, privacy, and security constraints (e.g., PII redaction, access control, secret management, key rotation, policy enforcement).

Agents can operate singly or in multi-agent systems using patterns such as manager-worker, marketplace/contract-net, blackboard, and swarm collaboration, with negotiation, role assignment, and consensus. They can support human-in-the-loop review and escalation, approval workflows, and guardrails (content filtering, compliance checks, safety policies). Operational capabilities can include real-time monitoring, telemetry and tracing, drift and anomaly detection, self-healing retries and fallbacks, circuit breaking, autoscaling, batching and caching, cost/latency/energy optimization, A/B testing, canary releases, and continuous training or fine-tuning. They can manage data preparation and automated feature extraction, perform simulation and sandbox testing, ensure provenance with lineage and signed attestations, and produce detailed audit logs, explanations, uncertainty estimates, and rationales appropriate for regulated environments.

Deployment contexts for aspects leveraging agents can include cloud, on-premises, edge, and air-gapped or intermittent-connectivity settings, with support for offline modes, state checkpoints, idempotent operations, and transactional guarantees. Through these capabilities, agents enable robust, transparent, and scalable automation across discovery, decision-making, execution, and continuous improvement with minimal human intervention while preserving oversight and accountability.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random-access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method for continuously verifying reserve backing of a digital token on a blockchain, the method comprising:

executing, by one or more processors of a computing system, at a predefined interval of less than one hour, a parallel analysis pipeline implemented by the computing system, the parallel analysis pipeline querying, via network interfaces of the computing system, a plurality of external data sources comprising custodial bank application programming interfaces (APIs), securities pricing feeds, and blockchain networks, and ingesting, in response to the querying, current reserve data and token circulation data from the plurality of external data sources into memory of the computing system;

normalizing, by the one or more processors, the ingested data into model-ready feature sets stored in the memory;

processing, by the one or more processors, the model-ready feature sets concurrently through an ensemble of four distinct artificial intelligence models operating in parallel to provide model redundancy and mitigate single points of failure, the ensemble comprising:

(i) a supervised learning model comprising a neural network that has been trained on labeled training data comprising historical examples of fraudulent and legitimate reserve patterns and that computes a fraud probability based on labeled transaction features and known fraud patterns;

(ii) an unsupervised anomaly detection model comprising multiple anomaly detection algorithms that have learned a baseline of normal multi-variate behavior and that compute an anomaly score by comparing observed multi-variate behavior to the learned baseline;

(iii) a time-series analysis model comprising at least one of an ARIMA model or an LSTM neural network that has been trained on historical time-series data and that computes trend health and forecasts reserve ratio trajectories across multiple temporal horizons; and (iv) a deterministic rule-based compliance engine that evaluates non-probabilistic regulatory and policy constraints and outputs constraint evaluations with hard pass/fail determinations;

executing, by the one or more processors, each of the four distinct artificial intelligence models to actively compute respective model outputs from the model-ready feature sets, the supervised learning model outputting a fraud probability and a confidence score, the unsupervised anomaly detection model outputting an anomaly score and an algorithm agreement metric, the time-series analysis model outputting a deviation score and trend health metrics, and the rule-based compliance engine outputting a compliance status and any violated rules;

aggregating, by the one or more processors executing a consensus engine implemented by the computing system, the respective model outputs of the supervised learning model, the unsupervised anomaly detection model, and the time-series analysis model by applying weighted scoring based on historical accuracy of each model to compute a weighted average verification score;

determining, by the consensus engine, an audit status based on the weighted average verification score and multi-signature threshold validation requiring agreement among at least three of the four distinct artificial intelligence models, while granting veto priority to the rule-based compliance engine such that any hard violation identified by the rule-based compliance engine overrides the weighted average verification score;

generating, by the one or more processors, a cryptographic attestation data structure comprising the audit status, reserve and token data, and respective model outputs;

transmitting, by the one or more processors via the network interfaces, the cryptographic attestation to a first blockchain network and recording the cryptographic attestation to the first blockchain network with near-real-time finality at each predefined interval; and periodically batching, by the one or more processors, a plurality of the cryptographic attestations, computing a Merkle root of the batch, and transmitting and anchoring the Merkle root onto a second blockchain network distinct from the first blockchain network to provide immutable checkpointing of audit results, the dual blockchain settlement providing high-frequency operational verification on the first blockchain network combined with periodic security anchoring on the second blockchain network.

2. The computer-implemented method of claim 1, wherein the neural network of the supervised learning model is trained using backpropagation with gradient descent optimization on the labeled training data comprising historical examples of fraudulent and legitimate reserve patterns, the labeled training data comprising historical fraud cases exhibiting patterns of reserve manipulation and legitimate operational patterns from compliant stablecoin operators.

3. The computer-implemented method of claim 1, wherein the supervised learning model comprises an ensemble of a gradient boosting classifier and a deep neural network, each trained on the labeled training data and generate outputs which characterize fraud probability.

4. The computer-implemented method of claim 1, wherein the multiple anomaly detection algorithms of the unsupervised anomaly detection model comprise an isolation forest algorithm, a local outlier factor (LOF) algorithm, a one-class support vector machine (SVM), and an autoencoder neural network, each trained to learn the baseline of normal multi-variate behavior and to produce respective anomaly scores that are aggregated to compute the anomaly score and the algorithm agreement metric.

5. The computer-implemented method of claim 1, wherein the time-series analysis model comprises a plurality of forecasting techniques including at least one of an AutoRegressive Integrated Moving Average (ARIMA) model trained to predict future values based on historical patterns, a Long Short-Term Memory (LSTM) neural network trained to learn temporal dependencies in sequential data, a seasonal decomposition technique that separates trend, seasonal, and residual components, or a change point detection technique that identifies moments where statistical properties of the time series change.

6. The computer-implemented method of claim 1, wherein the time-series analysis model is trained to forecast reserve ratio trajectories across micro-pattern, daily, weekly, and monthly temporal horizons and to output deviation scores quantifying distances between observed values and expected predictions.

7. The computer-implemented method of claim 1, wherein the predefined interval is less than 10 minutes, and the parallel analysis pipeline executes a continuous audit cycle at each predefined interval.

8. The computer-implemented method of claim 7, wherein the predefined interval is less than or equal to about one minute, and each audit cycle completes within less than or equal to about one minute including data ingestion via the network interfaces, model execution by the one or more processors, consensus determination by the consensus engine, and attestation recording to the first blockchain network.

9. The computer-implemented method of claim 1, wherein the Merkle root of the batched plurality of cryptographic attestations is anchored onto the second blockchain network daily to provide periodic security anchoring.

10. The computer-implemented method of claim 1, further comprising:

in response to the audit status indicating a failure condition based on the aggregated outputs of the four distinct artificial intelligence models, automatically transmitting, by the one or more processors, a halt instruction to a smart contract on the blockchain to reject execution of at least one pending token transaction.

11. The computer-implemented method of claim 1, wherein the consensus engine determines an audit status selected from PASS, CAUTION, ALERT, or HALT based on the weighted average verification score and the multi-signature threshold validation.

12. The computer-implemented method of claim 1, wherein querying the plurality of external data sources comprises querying custodial bank APIs to retrieve real-time balance information for reserve accounts, fetching current market valuations from securities pricing feeds for reserve assets, and querying blockchain networks to determine a total supply of tokens currently in circulation.

13. The computer-implemented method of claim 1, wherein the non-probabilistic regulatory and policy constraints evaluated by the rule-based compliance engine comprise at least one of reserve ratio thresholds, reserve composition requirements, transaction limits, custody diversification requirements across at least three independent custodians, access controls, or audit requirements.

14. The computer-implemented method of claim 1, wherein the plurality of external data sources for reserve data comprises at least three independent custodians, thereby enabling cross-verification of reserve balances across custodial venues.

15. A system for continuously auditing reserve backing of a blockchain-based digital token, the system comprising:

a data collection subsystem comprising network interface hardware that periodically queries a plurality of external data sources comprising custodial bank application programming interfaces (APIs), securities pricing feeds, and blockchain networks, and that ingests current reserve data and token circulation data from the plurality of external data sources;

memory hardware that stores the ingested reserve data and token circulation data as normalized, model-ready feature sets;

one or more processors coupled to the memory hardware and executing an artificial intelligence ensemble subsystem comprising four distinct, independently operating models, the four distinct models comprising:

(i) a supervised learning model comprising a neural network that has been trained using backpropagation on labeled training data comprising historical fraud cases and legitimate operational patterns, the supervised learning model computing a fraud probability and a confidence score based on labeled transaction features and known fraud patterns;

(ii) an unsupervised anomaly detection model comprising an ensemble of an isolation forest algorithm, a local outlier factor (LOF) algorithm, a one-class support vector machine (SVM), and an autoencoder neural network, each trained to learn a baseline of normal multi-variate behavior and to compute an anomaly score and an algorithm agreement metric;

(iii) a time-series analysis model comprising at least one of an AutoRegressive Integrated Moving Average (ARIMA) model or a Long Short-Term Memory (LSTM) neural network, each trained on historical time-series data to compute trend health and to forecast reserve ratio trajectories across micro-pattern, daily, weekly, and monthly temporal horizons; and (iv) a deterministic rule-based compliance engine that evaluates non-probabilistic regulatory and policy constraints comprising reserve ratio thresholds, asset eligibility requirements, operational policy requirements, and regulatory compliance requirements, and that outputs constraint evaluations with hard pass/ fail determinations;

a consensus engine implemented by the one or more processors, the consensus engine:

receiving model-specific outputs from each of the four distinct models, the model-specific outputs comprising a fraud probability and confidence score from the supervised learning model, an anomaly score and algorithm agreement metric from the unsupervised anomaly detection model, a deviation score and trend health metrics from the time-series analysis model, and a compliance status with any violated rules from the rule-based compliance engine;

applying weighted scoring by assigning a weight to each model based on historical accuracy and computing a weighted average verification score;

evaluating multi-signature thresholds requiring agreement among at least three of the four distinct models to determine an audit status selected from PASS, CAUTION, ALERT, or HALT, while granting veto priority to the rule-based compliance engine such that any hard violation identified by the rule-based compliance engine overrides the weighted average verification score; and in response to the audit status indicating ALERT or HALT, automatically transmitting a halt instruction to a smart contract on the blockchain to reject execution of pending token transactions; and a dual blockchain settlement subsystem that:

generates a cryptographic attestation data structure comprising the audit status, reserve and token data, and respective model outputs;

transmits the cryptographic attestation to a first blockchain network and records the cryptographic attestation to the first blockchain network with near-real-time finality at each predefined interval; and periodically batches a plurality of the cryptographic attestations, computes a Merkle root of the batch, and anchors the Merkle root onto a second blockchain network distinct from the first blockchain network to provide immutable checkpointing of audit results.

16. A system for continuously verifying reserve backing of a digital token on a blockchain, the system comprising:

one or more processors;

memory coupled to the one or more processors;

network interfaces coupled to the one or more processors; and a non-transitory computer-readable medium storing instructions that, when executed by the one or more processors, cause the system to:

execute, at a predefined interval of less than one hour, a parallel analysis pipeline implemented by the system, the parallel analysis pipeline querying, via the network interfaces, a plurality of external data sources comprising custodial bank application programming interfaces (APIs), securities pricing feeds, and blockchain networks, and ingesting, in response to the querying, current reserve data and token circulation data from the plurality of external data sources into the memory;

normalize the ingested data into model-ready feature sets stored in the memory; process the model-ready feature sets concurrently through an ensemble of four distinct artificial intelligence models operating in parallel to provide model redundancy and mitigate single points of failure, the ensemble comprising:

(i) a supervised learning model comprising a neural network that has been trained on labeled training data comprising historical examples of fraudulent and legitimate reserve patterns and that computes a fraud probability based on labeled transaction features and known fraud patterns;

(ii) an unsupervised anomaly detection model comprising multiple anomaly detection algorithms that have learned a baseline of normal multi-variate behavior and that compute an anomaly score by comparing observed multi-variate behavior to the learned baseline;

(iii) a time-series analysis model comprising at least one of an ARIMA model or an LSTM neural network that has been trained on historical time-series data and that computes trend health and forecasts reserve ratio trajectories across multiple temporal horizons; and (iv) a deterministic rule-based compliance engine that evaluates non-probabilistic regulatory and policy constraints and outputs constraint evaluations with hard pass/fail determinations;

execute each of the four distinct artificial intelligence models to actively compute respective model outputs from the model-ready feature sets, the supervised learning model outputting a fraud probability and a confidence score, the unsupervised anomaly detection model outputting an anomaly score and an algorithm agreement metric, the rule-based compliance engine outputting a compliance status and any violated rules;

aggregate, via a consensus engine implemented by the system, the respective model outputs of the supervised learning model, the unsupervised anomaly detection model, and the time-series analysis model by applying weighted scoring based on historical accuracy of each model to compute a weighted average verification score;

determine, by the consensus engine, an audit status based on the weighted average verification score and multi-signature threshold validation requiring agreement among at least three of the four distinct artificial intelligence models, while granting veto priority to the rule-based compliance engine such that any hard violation identified by the rule-based compliance engine overrides the weighted average verification score;

generate a cryptographic attestation data structure comprising the audit status, reserve and token data, and respective model outputs;

transmit, via the network interfaces, the cryptographic attestation to a first blockchain network and record the cryptographic attestation to the first blockchain network with near-real-time finality at each predefined interval; and periodically batch a plurality of the cryptographic attestations, compute a Merkle root of the batch, and transmit and anchor the Merkle root onto a second blockchain network distinct from the first blockchain network to provide immutable checkpointing of audit results, the dual blockchain settlement providing high-frequency operational verification on the first blockchain network combined with periodic security anchoring on the second blockchain network.

17. The system of claim 16, wherein the multiple anomaly detection algorithms of the unsupervised anomaly detection model comprise an isolation forest algorithm, a local outlier factor (LOF) algorithm, a one-class support vector machine (SVM), and an autoencoder neural network, each trained to learn the baseline of normal multi-variate behavior and to produce respective anomaly scores that are aggregated to compute the anomaly score and the algorithm agreement metric.

18. The system of claim 16, wherein the predefined interval is less than 10 minutes, and the parallel analysis pipeline executes a continuous audit cycle at each predefined interval.

19. The system of claim 16, wherein the consensus engine determines an audit status selected from PASS, CAUTION, ALERT, or HALT based on the weighted average verification score and the multi-signature threshold validation.

20. The system of claim 16, wherein the supervised learning model architecture comprises an ensemble of a gradient boosting classifier and a deep neural network, the supervised learning model configured to compute the fraud probability based on labeled transaction features and known fraud patterns.

* * * * *